No. 801,990. PATENTED OCT. 17, 1905.
G. KELLAR & E. THOMASON.
WATER GATE.
APPLICATION FILED MAR. 6, 1905.
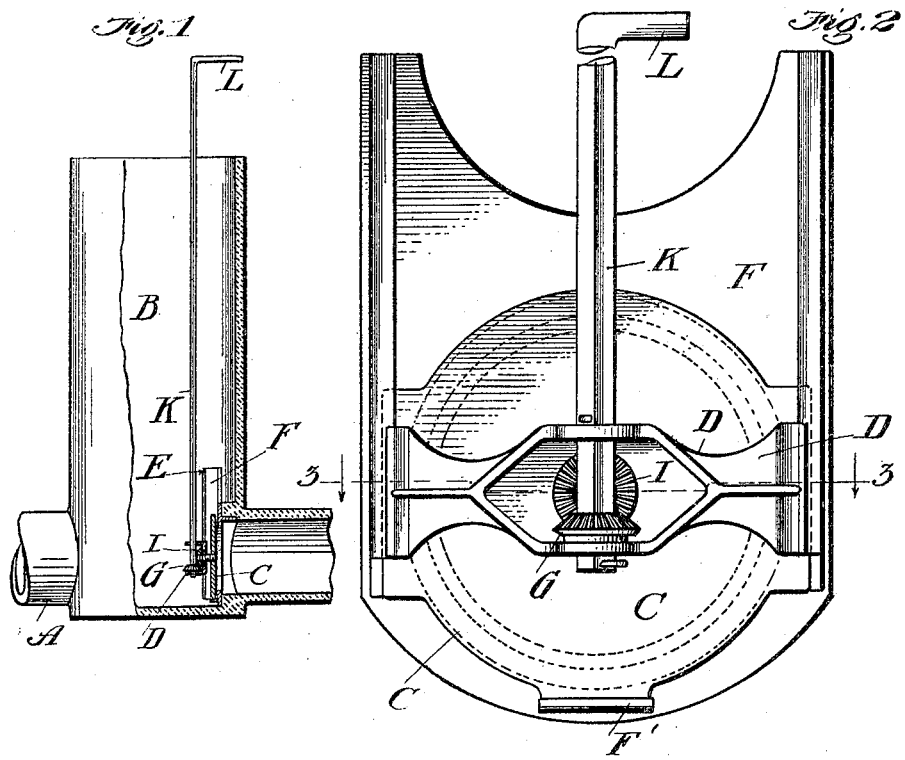
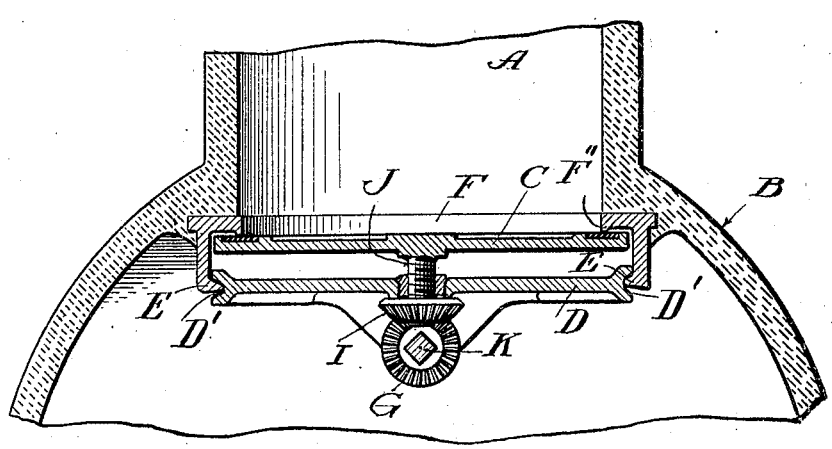
Witnesses
Inventors.
George Kellar and Elmer Thomason
by Hazard & Harpham
Attorneys

UNITED STATES PATENT OFFICE.

GEORGE KELLAR AND ELMER THOMASON, OF COVINA, CALIFORNIA.

WATER-GATE.

No. 801,990.   Specification of Letters Patent.   Patented Oct. 17, 1905.

Application filed March 6, 1905. Serial No. 248,730.

*To all whom it may concern:*

Be it known that we, GEORGE KELLAR and ELMER THOMASON, citizens of the United States, residing at Covina, in the county of Los Angeles and State of California, have invented new and useful Improvements in Water-Gates, of which the following is a specification.

The objects of our invention are to provide a water-gate for shutting off a part or all the water flowing in a pipe-line that will be reliable in action, simple and durable in construction; to provide at the same time a gate whose frame is adapted to be secured in place in the pipe-line without the use of bolts or other portable securing means; to provide a gate that will not clog and stick with sand and that obviates the excessive amount of friction usual in sliding gates; to provide means to place the gate in exact register with the seat and to press the same directly against the seat without turning the gate or moving it up or down while doing so, and to provide means to move the gate back and away from the seat at the same time it is being opened; to provide ample clearance for the movement of the gate vertically to and from its position in register with and in front of the seat. We accomplish these objects by the device described herein and illustrated in the accompanying drawings, in which—

Figure 1 is a side elevation, partly in section, of a fragment of a pipe-line with our gate secured in place therein. Fig. 2 is a front elevation of the gate in place in the face-plate. Fig. 3 is a fragment of a section taken on line 3 3 of Fig. 2 looking in the direction indicated by the arrow-heads thereon, showing the gate secured in place in the pipe-line.

In the drawings, A represents a pipe-line buried in the ground. Communicating with and extending upwardly therefrom is the stand-pipe B, adapted to elevate the water running through the pipe-line to the surface of the ground for irrigating purposes or otherwise. Covering the opening leading from the pipe-line into the stand-pipe our improved gate-plate C is operatively mounted. This gate is mounted on the cross-bar D and has on either side thereof guideways D' for the reception of the vertical guides E. These guides extend vertically on each side of and project outwardly from the face-plate F. When the gate-plate C is in place in the guides, it will drop down to and rest upon the lug F', projecting outwardly from the lower end of the face-plate, and hold the gate in register with the opening leading from the pipe-line to the stand-pipe. When the gate-plate is down and in line with the opening leading from the pipe-line into the stand-pipe, the gate-plate is brought into water-tight connection with the gate-seat F'', extending outwardly from and surrounding the circular opening in the face-plate, by rotating the operating-handle L. This handle is mounted on the locking-bar K, which is square in cross-section, and passes at its lower end through a square opening in the miter-gear G. This miter-gear meshes with an idler miter-gear I. The idler-gear has a screw-threaded opening for the screw-threaded engagement with the screw-threaded lug J, which projects outwardly from and is integral with the gate-plate C. Upon the rotation of the handle the miter-gears G and I will cause the gate to move to or from the seat F'' on the face-plate.

In placing the gate in position for use the guides E are placed in the guideway D' of the cross-bar, and the gate-plate is permitted to move down until it rests upon the lug F' on the foot of the face-plate. When the gate-plate is to be lowered into place, it is brought into a position close to the cross-bar D to afford clearance therefor in passing the seat F'' on the face-plate, and when in place, as shown in Fig. 2, the operating-handle is rotated until the gate-plate is pressed firmly against the seat. To remove the gate-plate from its place, the handle-bar is rotated in the reverse direction, withdrawing the gate-plate from contact with the seat, affording clearance for the gate-plate to pass the seat and permitting the easy removal of the gate-plate from its normal position. By this arrangement it is manifest that the gate-plate is easily moved into its normal or operative position or removed therefrom without rubbing against the seat provided therefor, and by the rotation of the handle any desired pressure can be placed on the gate-plate, where it will be firmly held, preventing unnecessary wear on the gate-plate and its seat in placing it into position or removing it therefrom.

Having described our invention, what we claim as new, and desire to secure by Letters Patent, is—

1. In a water-gate the herein-described means to move the gate-plate into contact with the seat of the gate and to remove the gate-plate from the seat, comprising a vertically-mounted locking-bar carried by a cross-bar having a handle on the top thereof and a miter-gear on the bottom end thereof, the miter-gear adapted to engage another miter-gear revolubly mounted in the cross-bar and having a central screw-threaded opening therethrough; a screw-threaded lug projecting outwardly from the gate-plate and adapted to enter into and engage the opening in the last-mentioned gear; and a vertically-mounted face-plate having vertical guides thereon and a cross-bar having guideways therein for the reception and operation of the guide on the face-plate, substantially as herein shown and described.

2. In a water-gate of a character herein described the herein-described means to move the gate-plate to and from the seat of the water-gate comprising a vertically-mounted face-plate having a seat thereon for the engagement of the gate and also vertical guides; a cross-bar having guideways for the reception of the guides on the face-plate, the said cross-bar having a central opening therethrough and having revolubly mounted therein a miter-gear; the said miter-gear having a screw-threaded opening therethrough for the reception of a screw-threaded lug on the gate-plate; a gate-plate having a screw-threaded lug projecting therefrom and adapted to engage the miter-gear in the cross-bar; a vertically-mounted locking-bar having a miter-gear on the bottom thereof adapted to engage the miter-gear first above mentioned.

3. In a water-gate of the character herein described having a face-plate with vertical guides thereon; a cross-bar with guideways mounted to move vertically along the guides on the face-plate; a gate-plate secured to said cross-bar and adapted to move vertically therewith and provided with a screw-threaded lug integral therewith and projecting outwardly therefrom; a miter-gear mounted on said lug and having a screw-threaded opening therethrough for the reception of the lug; a vertically-mounted locking-bar carried by said cross-bar and having at the lower end thereof a miter-gear, the said miter-gear adapted to mesh with the hereinbefore-mentioned miter-gear, whereby upon the rotation of the locking-bar the gate-plate is caused to move toward or from the seat on the face-plate substantially as herein shown and described.

4. In a water-gate of the character herein described the herein-described means to move the gate-plate to and from the seat of the gate, comprising the vertically-mounted locking-bar K having keyed on the lower end thereof the miter-gear G, the said locking-bar being carried by and rotatably mounted in the cross-bar D; cross-bar D having guideways for the reception of vertical lugs E on the face-plate, the vertical face-plate F having the gate-seat F'' thereon and provided with vertical guides E; a gate-plate C having a screw-threaded lug J projecting therefrom; a miter-gear I revolubly mounted in the cross-bar and having a screw-threaded opening therethrough for the reception of the screw-threaded lug on the gate-plate.

In witness that we claim the foregoing we have hereunto subscribed our names this 16th day of February, 1905.

GEORGE KELLAR.
ELMER THOMASON.

Witnesses:
  E. P. WARNER,
  E. S. ROBINSON.